Dec. 31, 1963  E. KESSLER III  3,116,482
METEOROLOGICAL DISPLAY SYSTEM
Filed Sept. 18, 1959  2 Sheets-Sheet 1

INVENTOR.
EDWIN KESSLER III
BY Wade Loomis and
Willard R. Matthews Jr.
ATTORNEYS Dec. 31, 1963  E. KESSLER III  3,116,482
METEOROLOGICAL DISPLAY SYSTEM
Filed Sept. 18, 1959  2 Sheets-Sheet 2

INVENTOR.
EDWIN KESSLER III
BY Wade Koontz
Willard R. Matthews Jr.
ATTORNEYS

United States Patent Office

3,116,482
Patented Dec. 31, 1963

3,116,482
METEOROLOGICAL DISPLAY SYSTEM
Edwin Kessler III, 170 Mayfair Drive,
Westwood 1, Mass.
Filed Sept. 18, 1959, Ser. No. 840,982
9 Claims. (Cl. 343—5)
(Granted under Title 35, U.S. Code (1952), sec. 266)

The invention described herein may be manufactured and used by or for the United States Government for governmental purposes without payment to me of any royalty thereon.

This invention relates to a meteorological radar system for determining the density of precipitation, the thickness and discontinuities of cloud formation, weather conditions and other navigational hazards in a surrounding area, and more particularly to a novel means for automatically displaying the intensity distribution of precipitation for given elevation, azimuth and range parameters, said display means being designated the profile of average reflectivity scope and hereafter referred to as the PAR scope.

It has been the practice in the past, in the use of meteorological radar, to apply the returned noncoherent echo signals, which echo signals represent the reflectivity of precipitation, to a pulse integrator thereby obtaining an averaged signal value which is responsive to weather conditions at a given range and azimuth. The output of said pulse integrator has heretofore been used to drive the recording arm of a panel or recording milliammeter. The sensitivity and accuracy of information recorded by this method is greatly reduced by the inherent lag associated with even the fastest responding mechanical instruments. This lag requires in many cases that the radar antenna be directed steadily at the precipitation being measured until the recorder indicates an unvarying value. This technique is slow and also prevents simultaneously collection of semi-quantitative data from the other conventional radar displays such as the Plan Position indicator and the range-height indicators. Also present techniques for obtaining a graphic representation of density of precipitation versus range or azimuth parameters require that range and azimuth data be noted on the moving graph paper of a recording milliammeter at timed intervals, and that the data thus recorded be correlated and plotted. The above enumerated difficulties of such recording and analyzing methods have long hindered investigation of the relationships between quantitative reflectivity distribution and other meteorological parameters.

Accordingly it is a principal object of the present invention to teach a novel method of presenting a meteorological display representing the distribution of average reflectivity of precipitation for a given area in space.

It is another object of the present invention to teach a novel method of presenting simultaneously meteorological displays representing the distribution of average reflectivity of precipitation in a given spatial area and other conventional two dimensional intensity modulated displays.

It is another object of the present invention to provide a rapid and accurate means of collecting and processing quantitative radar data relating to spatial and temporal distribution of weather echoes.

It is another object of the present invention to teach a novel method of presenting any given radar target along a given locus in space.

It is another object of the present invention to provide a weather radar display system which will permit simultaneous photography of the range height indicator and the plan position indicator with the PAR scope for given range, height, or azimuth parameter.

It is another object of the present invention to provide a display representing the reflectivity of precipitation which is not subject to the time lag inherent in prior art mechanical recording devices.

These and other objects of the invention will become apparent from the following specification and drawings, of which, FIG. 1 is a block diagram of an embodiment of the invention;

Figure 1:
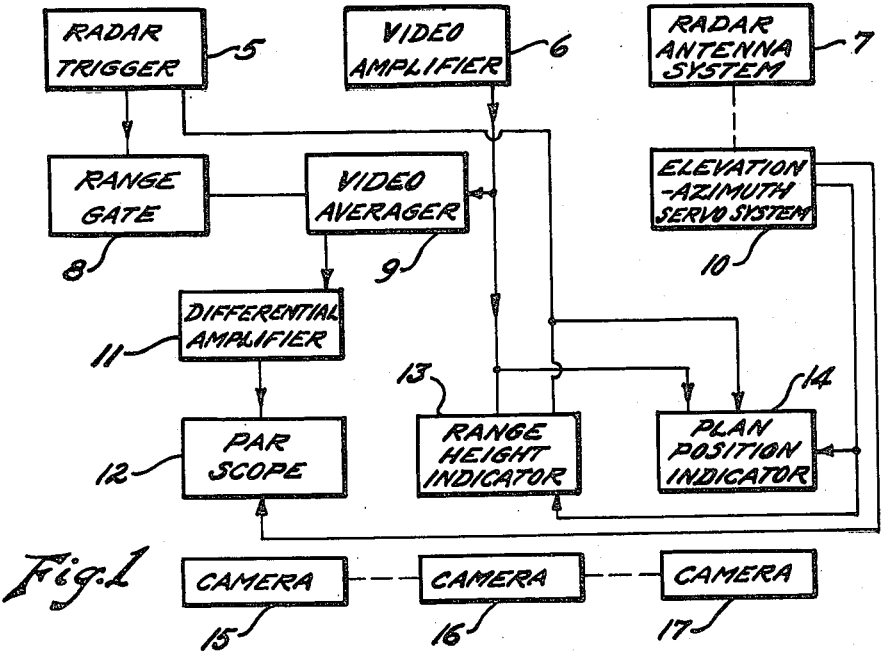

In the circuit shown in block diagram in FIG. 1 of the drawings radar trigger 5 activates range gate 8 which admits from video amplifier 6 only signals corresponding to a predetermined range. The output of video amplifier 6 thus gated is applied to video averager 9 at the pulse repetition frequency of the radar. The integrated signal now representative of the average value of the video input to grid 29 FIG. 2 appears at the output of video averager 9 and is then amplified by differential amplifier 11. The integrated amplified signal which appears at the output of differential amplifier 11 is coupled directly to the horizontal deflection plates of PAR scope 12. PAR scope 12 comprises a cathode ray tube having, horizontal and vertical deflection plates, a luminescent screen and beam intensity control. The integrated amplified signal applied to the horizontal deflection plates of PAR scope 12 drives the beam horizontally according to the average reflectivity of precipitation of the area being investigated. A display representing the reflectivity of precipitation versus elevation at a given range is then obtained by maintaining a fixed range gate and feeding antenna elevation information to the vertical deflection plates of PAR scope 12. Elevation information is obtained from an elevation-azimuth servo system 10 which is mechanically coupled to antenna system 7; which transmits and receives signals. The output of the elevation potentiometer in elevation-azimuth servo system 10 is proportional to the sine of the elevation angle and equal vertical increments of PAR scope 12 and therefore corresponds to equal increments of height. The line drawn by the traveling dot on the luminescent screen of PAR scope 12 is determined by two factors. First it illustrates the PAR scope response to the rapid natural fluctuations of the weather signals about their average value. Secondly the reflectivity or average value of the amplitude varies in space and time and, according to the time constant and speed of antenna scan selected, the output of video averager 9 will tend to vary with the swings of average signal amplitude along the scanned volume. Returned echo signals and elevation and azimuth information are supplied to Range Height Indicator 13 and Plan Position Indicator 14 by conventional means. Radar scope cameras 15, 16 and 17 are arranged to simultaneously photograph the displays presented at PAR scope 12, Range Height Indicator 13 and Plan Position Indicator 14.

Figure 2:
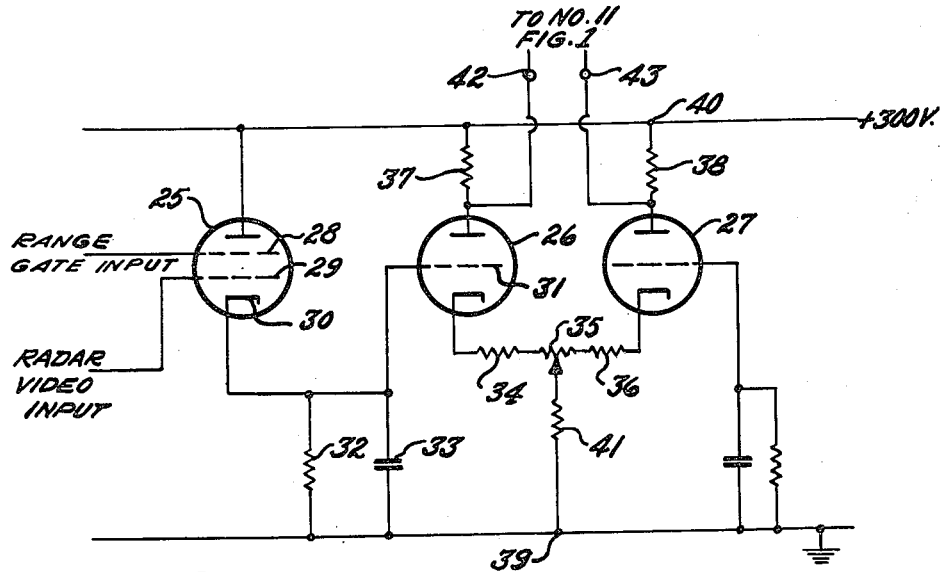
FIG. 2 is a schematic diagram of the averager stage of the invention.

FIGURE 2 illustrates a simplified schematic diagram representing the video averager stage applied in one embodiment of the present invention. The radar trigger is made to occur at the pulse repetition frequency of the radar system and is applied to screen grid 28 of tube 25 allowing tube 25 to conduct during pre-set gated intervals. The amount of current that will flow through tube 25 is dependent upon the voltage applied to control grid 29 during the interval which screen grid 28 allows tube 25 to conduct. This grid voltage is determined by the radar video signal. The condition of control grid 29 of tube 25 tends to produce a voltage change at cathode 30 of tube 25 and also on grid 31 of tube 26 which voltage change is resisted by the associated intergrating RC circuit which consists of resistor 32 and capacitor 33. Tubes 26, 27 and resistors 34, 35, 36, 37, 38, 41 comprise a bridge circuit between ground point 39 and potential point 40. Resistors 34, 35, 36 and 41 comprise the zero set adjustment for said bridge circuit. Any voltage on grid 31 of tube 26 caused by tube 25 conducting unbalances the bridge circuit and causes a current to flow. Because of the rapid fluctuations of the returned echo signals the time constant of integration RC circuit 32, 33 is made to be several times longer than the interval between radar pulses. Therefore the signal applied to control grid 31 of tube 26 is responsive to the averaged amplitude of the received radar echoes. Said signal when applied to control grid 31 of tube 26 unbalances the bridge circuit causing a current to flow and a difference voltage, which is proportional to the average intensity of precipitation, to appear at terminals 42 and 43 of the differential amplifier.

Figure 3:
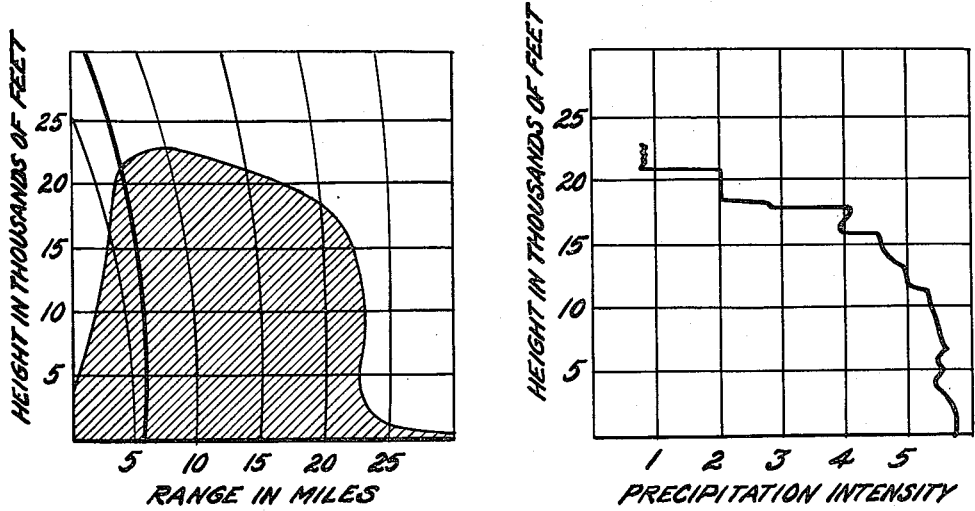
FIG. 3 illustrates simultaneous presentations of intensity distribution versus height for a given range and the range height indicator.

FIG. 3 illustrates simultaneous displays of PAR scope 12 and Range Height Indicator 13. The total range of the range height display is 25 miles and range marks appear at 5 mile intervals. The range marks at 6 miles in the range height indicator delineate the strip along which the PAR scope photograph applies. These records are of particular value because they show how the quantitative record along a particular line is related to the geometric distribution of echoes on the Range Height Indicator.

The simultaneous display of PAR scope 12 and Range Height Indicator 13 represents of course only one mode of operation of the present invention. It can be readily seen by those skilled in the art that the display system disclosed herein could also be adapted to display reflectivity of precipitation using range or azimuth as the vertical coordinates should such data be desired. In weather studies however, range variations introduce troublesome corrections due to range attenuation and variations of the size of the volume in space which is effectively surveyed at once by the radar beam, and it is therefore usually preferable to collect PAR scope data at some constant range. In the present application, radar trigger 5 energizing range gate 8 is also the variable range marker of the radar. This marker appears on the Plan Position Indicator and the Range Height Indicator and is continuously variable from zero to maximum radar range.

Figure 4:
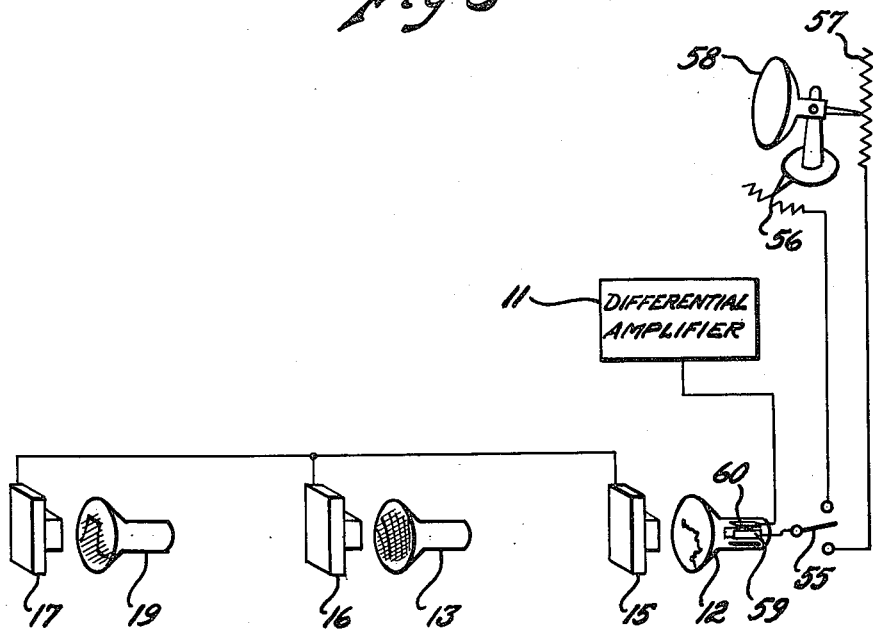
FIG. 4 illustrates a pictorial representation of the display means, cameras and antenna system of the invention.

FIGURE 4 presents a perspective view of the display arrangement described herein together with a pictorial representation of the associated cameras 15, 16, 17 and antenna means 58. Horizontal deflection plates 59 of PAR scope 12 are connected to either elevation potentiometer 57 or azimuth potentiometer 56 through selector switch 55. Vertical deflection plates 60 are shown connected to differential amplifier 11. Position information from the antenna system and intensity information from the video amplifier stage is applied to RHI scope 13 and PPI scope 14 by conventional means.

The above-described mode of operation illustrates but one of many display arrangements made possible by the subject invention.

While I have described the above principles of my invention in connection with specific apparatus, it is to be clearly understood that this description is made only by way of example and not as a limitation to the scope of my invention as set forth in the objects thereof and in the accompanying claims.

I claim:

1. A radar system for determining meteorological conditions in a given area including means for transmitting signals to and receiving echo signals from cloud formations, means to gate signals corresponding to a predetermined range, echo signal pulse integrating means, a cathode ray tube having intensity control means, horizontal and vertical deflecting elements and a luminescent screen, means for applying said integrated signal pulses representing average reflectivity of precipitation to one set of said deflecting elements, means for obtaining elevation and azimuth information, switching means for selecting therebetween, and means for applying said selected information to the other set of said deflection elements.

2. In a weather radar system including a scanning antenna for radiating signals to and receiving echo signals from distributed targets in a given spatial area; the combination comprising pulse timing means adapted to gate received echo signal pulses once each pulse recurrence interval of the signal pulse transmitter for instants corresponding to predetermined ranges, RC integrating circuit means adapted to average said received gated echo pulses, a cathode ray oscilloscope, means for applying said averaged echo pulses to the horizontal deflection elements of said cathode ray oscilloscope, potentiometer means adapted to determine the direction of signal radiation, and means to apply said direction information to the vertical deflection elements of said cathode ray oscilloscope.

3. A meteorological radar display system comprising a radar transmitter, a receiver responsive to reflections of energy radiated from said transmitter, a scanning antenna, means to gate reflected signals corresponding to predetermined ranges, an integrating circuit capable of averaging said reflected signals, means to amplify said averaged signals, a cathode ray tube having horizontal and vertical deflecting elements and a luminescent screen, potentiometer means for determining azimuth information, means for applying said averaged amplified reflected signals to one set of said deflecting elements, and means for applying said azimuth information to the other set of said deflecting elements.

4. The apparatus as defined in claim 3 wherein said radar display system includes a plan position indicator.

5. The apparatus as defined in claim 3 wherein said radar display system includes a range height indicator.

6. The apparatus as defined in claim 4 wherein said radar display system includes means to simultaneously photograph said plan position indicator and said cathode ray tube luminescent screen.

7. The apparatus as defined in claim 5 wherein said radar display system includes means to simultaneously photograph said range height indicator and said cathode ray tube luminescent screen.

8. In the detection of meteorological conditions a system for providing a display representing the distribution of reflectivity through precipitation comprising radar transmitting and receiving means, directional antenna means adapted to radiate energy to successive portions of a given area in space and to receive echo signals from cloud formations present in said area in space for the detection of meteorological conditions, means to gate said echo signals corresponding to predetermined ranges, received echo signal pulse integrating means, differential amplifier means responsive to said integrated received echo signal pulses, a cathode ray tube having a luminescent screen and horizontal and vertical deflecting elements, means for applying the output of said differential amplifier to one set of cathode ray tube deflecting elements, means for obtaining elevation and azimuth information, switching means for selecting therebetween, means for applying said selected information to the other set of said deflection elements, range height indicator display means, plan position indicator display means, and means for simultaneously photographing said displays with said cathode ray tube luminescent screen.

9. A meteorological radar display system comprising a radar transmitter, a receiver responsive to reflections of energy radiated from said transmitter, a scanning antenna, means to gate reflected signals corresponding to predetermined ranges, an integrating circuit capable of averaging said reflected signals, means to amplify said averaged signals, a cathode ray tube having horizontal and vertical deflecting elements and a luminescent screen, potentiometer means for determining elevation information, means for applying said averaged amplified reflected signals to one set of said deflecting elements, and means for applying said elevation information to the other set of said deflecting elements.

References Cited in the file of this patent

UNITED STATES PATENTS

| | | |
|---|---|---|
| 2,237,604 | Marique | Apr. 8, 1941 |
| 2,782,412 | Brockner | Feb. 19, 1957 |